Sept. 18, 1973 A. NOBELL 3,759,687
METHOD FOR MANUFACTURE OF UREA-FORMALDEHYDE FERTILIZER
Filed April 30, 1971
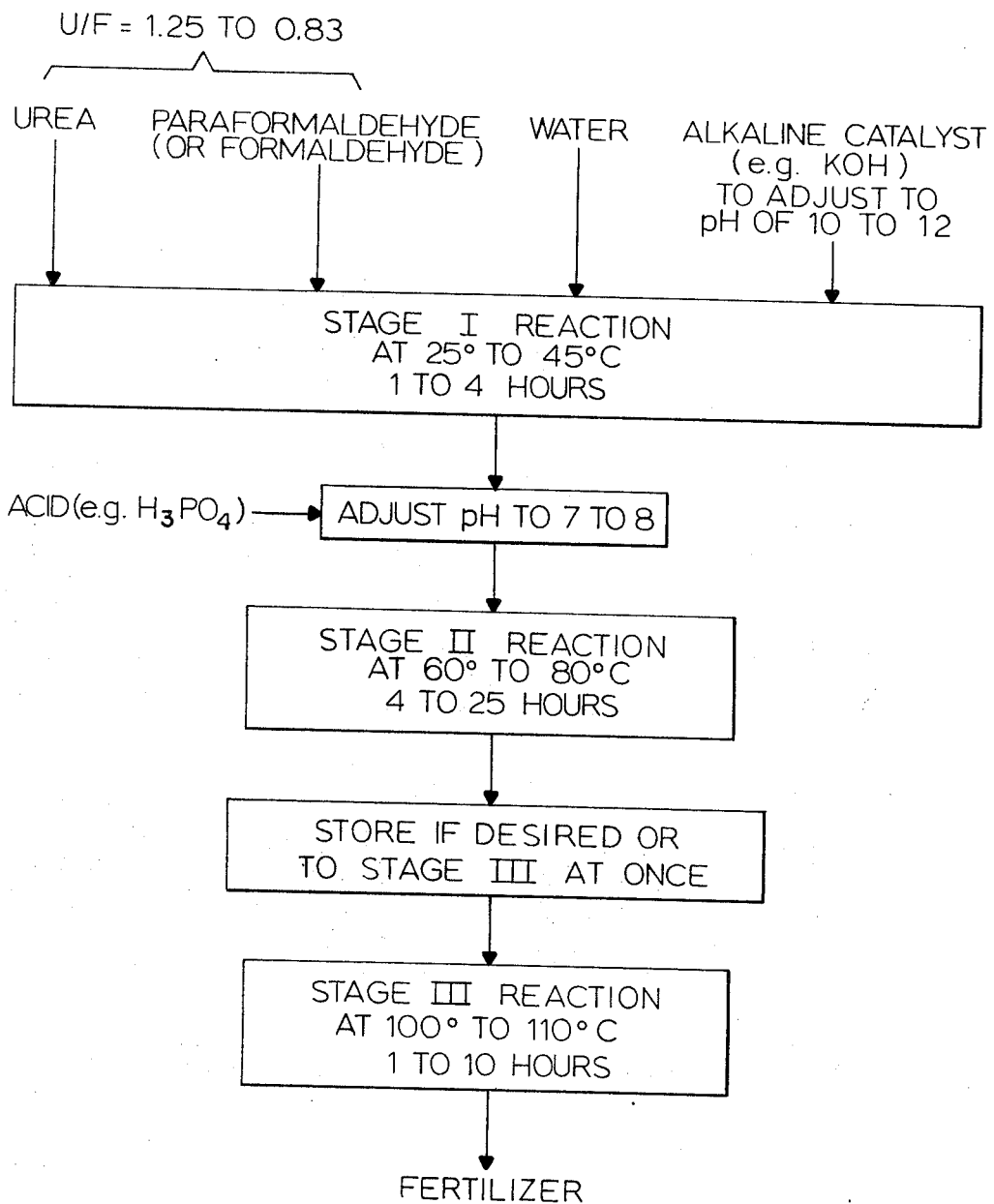
INVENTOR.
ALBERT NOBELL
BY
ATTORNEYS

3,759,687
METHOD FOR MANUFACTURE OF UREA-FORMALDEHYDE FERTILIZER
Albert Nobell, P.O. Box 155, Coloma, Calif. 95613
Filed Apr. 30, 1971, Ser. No. 138,941
Int. Cl. C05c 9/00
U.S. Cl. 71—28        9 Claims

ABSTRACT OF THE DISCLOSURE

An improved urea-formaldehyde fertilizer is made by reacting at 25° to 45° C. for one to four hours an alkaline aqueous mixture at pH 10 to 12 of urea and paraformaldehyde or formaldehyde in a urea-to-formaldehyde mol ratio of about 1.25 to about 0.83. Then the pH is adjusted to between 7 and 8, and the product is heated to between 60° and 80° C. for from 4 to 25 hours. Finally, in the third stage of treatment the product is heated at 100° to 110° C. for from 1 to 10 hours. The resulting fertilizer is exceptionally high in cold-water-insoluble nitrogen and has a high Availability Index.

BACKGROUND OF THE INVENTION

This invention relates to improvements in nitrogeneous fertilizer compositions derived from urea and formaldehyde. It relates to a new product and to a process for making that product so as to obtain a greater proportion of cold-water-insoluble nitrogen.

Urea-formaldehyde condensation products have long been known, and the use of certain of them as fertilizer materials has been known for some time. For example, they were so described by K. G. Clark, J. Y. Yee and K. S. Love in Industrial and Engineering Chemistry, 40, July 1948. This article indicates that the differentiation between urea-formaldehyde products suitable for fertilizers and those unsuitable is related to the mol ratio of urea and formaldehyde in the reaction mixture and to the pH of the reaction conditions. Normally, as this article indicates, by condensing urea and formaldehyde under alkaline conditions, in mol ratios equal to or less than 1, methylol compounds are formed which are useful as precursors to the preparation of urea-formaldehyde resins, whereas under acidic conditions and under mol ratios of urea to formaldehyde substantially greater than 1, urea-formaldehyde compositions useful as fertilizer material are formed.

The utility of nitrogen-bearing fertilizer materials is well known in agriculture and horticulture, and it is known that urea-formaldehyde products have the advantage over conventional fertilizer materials of having a larger portion of their nitrogen content insoluble in cold water, so that the availability of nitrogen for developing plant growth is extended, being made available by soil bacteria action upon the urea-formaldehyde material. Furthermore, when nitrogen is in a cold-water-insoluble form it is not leached from the soil immediately after application. An additional advantageous feature of urea-formaldehyde type of fertilizer materials is the reduced likelihood of burning plant roots and leaves, in contrast to the likelihood of burning when many of the conventional fertilizer salts, especially those fertilizers with a high content of cold-water-soluble nitrogen compounds, are used and applied over the plants or in the vicinity of the plant roots with insufficient water.

It has also for some time been recognized as an important matter that the measurement of the cold-water-insoluble nitrogen and also the measurement of that portion of the cold-water-insoluble nitrogen which is soluble in hot water, or better, in a buffered hot aqueous solution, such as a hot aqueous phosphate solution, will give a good indication for a desired fertilizer. A relationship between these two solubilities has been determined by an accepted test and is given the name of "Availability Index." This test has been described by R. D. Kralovec and W. A. Morgan in "Urea-Formaldehyde Fertilizers," Agriculture and Food Chemistry, volume 2, No. 2, pages 92 to 94, 1954. The Availability Index is an empirical approximation of the water-insoluble nitrogen available for nitrification over a period of about 6 months and is determined, according to the above-mentioned article, by the formula:

Availability Index
$$= \frac{\text{percent CWIN minus percent HWIN}}{\text{percent CWIN}} \times 100$$

where

CWIN means cold-water-insoluble nitrogen, i.e., nitrogen that is not soluble in water at 25° C.±2° C. and HWIN means nitrogen insoluble in a hot aqueous solution of a phosphate buffer, namely $KH_2PO_4$ and $K_2HPO_4$, which has a pH of 7.5.

An Availability Index of 40 or greater has been considered satisfactory for urea-formaldehyde products useful in fertilizer applications, but higher values are recognized as being even better. For example, see J. B. Smith "Report of the Sub-committee Recommendations of the Referee—Nitrogen Activity Index" in J.A.O.A.C., volume 38, No. 1, 1955. The Availability Index of various products manufactured by typical acidic processes is only in the range of 40 to 50, with the cold-water-insoluble nitrogen usually in the range of 60% to 70%.

It is important to recognize that the cold-water-insoluble nitrogen fraction is a measure of the entire nitrogen available for plant nutrition over an extended period of time. Hence, it is better when it is quite high. The Availability Index indicates the relative amount of that portion of the long-lasting nitrogen which becomes available within a six month period. The Availability Index is not a precise measurement of the exact amount of nitrogen available within a six month period, as is shown by a thesis by G. C. Kaempffe entitled "Urea-Formaldehyde Nitrogen: Plant Availability and Utilization," Master of Arts Thesis, University of California, Los Angeles, Calif. Because of interaction of the various fractions and because of variations in conditions, the measurement of the three fractions (that is, cold-water-soluble nitrogen, hot phosphate buffer soluble nitrogen and hot phosphate buffer insoluble material) is not an exact measurement of these specific kinds of nitrogen available with respect to time, yet it does stand as a reasonable useful approximation and will be used herein as a significant value.

Heretofore, the urea-formaldehyde fertilizer compositions have had fixed characteristics due to limitations imposed, at least in part, by the speed of the condensations under the acidic conditions, that is, at a pH lower than 7, typically in the pH range between 2 and 4. These limitations relate to the amount of hot phosphate buffer soluble nitrogen available for plant use. In order for the urea-formaldehyde nitrogen to be converted into a form available to the plant and to provide the nitrogen in a form useful in plant nutrition, all of the cold-water-insoluble nitrogen must be degraded by soil bacteria. The products available heretofore have had fixed characteristics within a narrow range of solubilities and the availability of nitrogen through bacterial attack has also been fixed within the conditions exerted by the soil and bacteria.

Typical processes known in the art of manufacturing urea-formaldehyde fertilizers have enabled little or no control over the amount of hot phosphate buffer soluble nitrogen that is formed in the reaction. Also, the process conditions particularly, as relates to the use of low pH, have necessitated corrosion-resistant equipment, which is expensive to purchase, difficult to work with, and expensive to maintain.

The present invention provides a fertilizer that has improved characteristics and which does not present such problems in manufacture as have been presented in the prior art.

Thus, one object of the invention is to provide a process for preparing an improved urea-formaldehyde fertilizer composition in which the nitrogen availability can be controlled to provide a greater percentage of the available nitrogen in a slow-release form and yet provide increased availability during the approximate six month period. For example, the invention makes it possible to provide fertilizer compositions having cold-water-insoluble nitrogen as 80% or more of its composition, having also an Availability Index of 60 or higher.

Another object of the invention is to provide a method for manufacturing urea-formaldehyde condensation products of higher agronomic value by substantially adjusting the hot-water-soluble fraction at will. The invention thus makes it possible to regulate the nitrogen availability to match end use conditions and crop requirements.

An additional object of the invention is to provide a method for manufacturing urea-formaldehyde fertilizer compositions under controlled conditions and where less expensive equipment not requiring corrosion resistance can be used. As a result, the process and the product become less expensive.

Another object of the invention is to provide an improved urea-formaldehyde fertilizer high in Availability Index and in a cold-water-insoluble nitrogen.

SUMMARY OF THE INVENTION

Broadly the invention comprises the use of a three-stage process.

In the first stage, urea and formaldehyde or parformaldehyde, in a urea-to-formaldehyde ratio of about 1.25 to about 0.83 are caused to react in an alkaline aqueous mixture of pH 10 to 12 and at a temperature of 25° to 45° C. for from 1 to 4 hours. Preferably, paraformaldehyde is used, with the water present in an amount from 15% to 40% by weight of the urea and formaldehyde taken together. Preferably, the optimum temperature appears to be 39° to 41° C.

The product at the end of this first stage is not remarkable, for it is relatively low in cold-water-insoluble nitrogen as well as in hot-water-insoluble nitrogen, and it has a rather low Availability Index.

In Stage II the pH is first adjusted to between 7 and 8, preferably 7.4, as by the addition of acid, and then the product from Stage I is heated to between 60° and 80° C. for from 4 to 25 hours. A preferred range is a temperature of 65° to 75° and a time of from 5 to 7 hours.

The product after Stage II is substantially higher in cold-water-insoluble nitrogen, is probably lower in hot-water-insoluble nitrogen, and it has a much higher Availability Index. It might be a satisfactory product to use but it is preferred to carry it further to get still better results.

In Stage III, the material from Stage II, either immediately or after some period of storage, is heated at 100° to 110° C. for from 1 to 10 hours, preferably 1 to 4 hours.

The product resulting from Stage III is very high in cold-water-insoluble nitrogen, very good in hot-water-insoluble nitrogen from the standpoint of what is desired, and it has a high Availability Index.

It is important to note that all of the three stages are carried out above neutral, within the range of pH 7 to 12. Each stage of the reaction process has its own importance in order to obtain a product having the desired high cold-water-insoluble nitrogen and high Availability Index.

BRIEF DESCRIPTION OF THE DRAWING

Other objects and advantages of the invention will appear from the following description of some preferred embodiments, given with reference to the drawing, which is a flow sheet illustrating the process.

DESCRIPTION OF THE PREFERRED EMBODIMENTS

Stage I is carried out in aqueous media in the presence of an alkaline catalyst, such as sodium or potassium hydroxide, with the latter being preferred, at the temperatures and times indicated above. Only mild agitation is required to promote the formation of the desired low molecular weight methylol ureas which are formed in this stage. The urea employed in the reaction may be any of the commercially available ureas, whether crystalline or prilled. While paraformaldehyde is the preferred aldehyde, formaldehyde may be used, as in a 37% aqueous solution. The presence of the additional water makes the use of formaldehyde somewhat more expensive, since the water must sooner or later be boiled off, and it also speeds the reaction to a point where it may be difficult to control. Hence, the use of paraformaldehyde is preferred, largely for slowing the reaction speed and for enabling better control of it and also for reducing the amount of water that must eventually be removed in order to obtain the ultimate product in a dry form. When using paraformaldehyde, water may be present at about 15% to 40% by weight of the two main reactants and should be included as part of the medium. The reaction mixture should contain at least 15% water to get a reasonable reaction speed. When more than 40% water is used, it would be expensive to boil the water off from the reaction product. The resutling reaction mixture is a very fluid translucent liquid with a pH of 10 to 12.

After completion of the first stage, the pH of Stage I product is adjusted with a suitable acid. Any type of acid not having features objectionable with the fertilizer or with the ureaformaldehyde may be used. A very good one to use is phosphoric acid. However, depending on circumstances, nitric, sulfuric, or hydrochloric acids or other suitable acids may be used. When the pH is set at somewhere between 7 and 8, preferably about 7.4, the reaction mixture is then heated in Stage II of the process, with agitation, to between 60° to 80° C., preferably between 65° to 75° C. and is held at the desired temperature for a period of 4 to 25 hours, preferably 5 to 7 hours. The product of the Stage II reaction is extremely stable for this type of resin and can be stored for several days or even several weeks without substantial degradation. If batch methods are employed, it may be desired to cool the material and store it until it is time to use it in Stage III, but if a continuous process is desired, such storage is, of course, not necessary nor is the cooling.

Stage III, which may be either an integral continuation from Stage II or may follow it later in time, involves treating the material at a temperature of 100° to 110° C. for from 1 to 10 hours, preferably 1 to 4 hours. Preferably the product is spread thinly on a drying belt, tray or drum. Another very satisfactory treatment is obtained by extruding the material, when it is of suitable viscosity, from Stage II directly and then drying it at the stated temperature of 100° to 110° C., usually for from 1 to 4 hours.

Each of the three stages is important in order to obtain a urea-formaldehyde fertilizer composition of desired extended release characteristics. A maximum hot-water-soluble fraction and the correspondingly high Availability Index can be obtained from selected adjustment of the variables described in each stage. As an example of what happens in the various stages, the following table is provided, showing the cold-water-insoluble nitrogen CWIN, the hot-water-insoluble nitrogen HWIN, and the Availability Index, A. I. at the three stages and also giving a comparison with two commercially available urea-formaldehyde materials.

| Urea-formaldehyde material | CWIN | HWIN | A.I. |
| --- | --- | --- | --- |
| Stage: | | | |
| I | 29.7 | 27.3 | 8.0 |
| II | 54.7 | 20.3 | 63.0 |
| III | 87.1 | 26.7 | 69.3 |
| Prior art urea-formaldehyde A | 2.09 | 0.4 | 81.0 |
| Prior art urea-formaldehyde B | 77.5 | 35.7 | 51.3 |

The equipment used in the reaction products is not critical; many types suitable to the conditions indicated are acceptable. Corrosion-resistant equipment is not required, though it may, of course, be used, since the reactions occur at a relatively low temperature and under neutral to slightly alkaline conditions, rather than under the strongly acidic conditions heretofore used.

The invention is further illustrated by the following examples:

Example I

Into a batch vessel, fitted for agitation, were charged 1,217 grams of urea pellets and 612 grams of paraformaldehyde (97.8%) powder, giving a urea-to-formaldehyde mol ratio of 1:1. Also into the vessel were charged 400 grams of water and 60 milliliters of 1–N potassium hydroxide. The charged materials were mixed thoroughly and, due to the negative heats of solution, the temperature dropped to 8° C. and then began to rise slowly. Heat was applied with continued agitation to bring the mixture to 39° C. slowly after a period of 2 hours. It was then held at 39° to 41° C. for 1 hour. At the end of this hour the pH of the mixture was 11.1.

The pH was then adjusted to 7.3 by adding 8 ml. of 2-molar phosphoric acid. Next, treatment in Stage II was done by heating to 70° C. and holding that temperature for 25 hours. The reaction mixture became increasingly viscous, and after the 25-hour treatment of 70° C. it was extruded directly onto drying trays.

Stage III comprised drying the extruded urea-formaldehyde reaction mixture from Stage II at 100° C. for 2 hours.

Analysis of the resulting product showed a cold-water-insoluble nitrogen-containing fraction of 80.7%, a hot-water (phosphate-buffer)-insoluble nitrogen fraction of 23.3% and an Availability Index of 71.1.

Example II

A batch was prepared as described in Example I through Stage II and through the extrusion onto oven trays, but it was treated somewhat differently in Stage III. There it was subjected to a temperature of 100° to 106° C. for 8 hours. The product resulting from this treatment had a cold-water-insoluble fraction of 90.7%, a hot-water-(phosphate-buffer)-insoluble fraction of 32.2% and an Availability Index of 64.5. This product would be a longer lasting product but would not give as much feeding during the first 6 months.

Example III

A reaction charge described in Example I was prepared, but the treatment was different in each stage. In Stage I the charge was heated with agitation to 40° to 44° C. for 1 hour. It was then held there for 1 hour, after which 8 ml. of 2-molar phosphoric acid was added to reduce the pH from 11.0 to 7.5. In Stage II the reaction mixture, which was a slightly translucent fluid, was heated to 70° C. and held there for 7 hours. After being held for 7 hours the mixture was cloudy and opaque. This mixture was spread thinly over the surface of drying oven trays and, for Stage III treatment, the trays were placed in an oven of 102° C. for 2 hours 45 minutes.

The product had a cold-water-insoluble fraction of 81.4%, a hot-water-(phosphate-buffer)-insoluble of 20.0% and an Availability Index of 75.4.

Example IV

A reaction vessel was charged with 60.85 grams of urea pellets and 27.54 grams of paraformaldehyde (97.8% powder) giving a mol ratio of 1.1 to 1. Then, 20 grams of water and 3 ml. of 1-N potassium hydroxide were added with agitation. The temperature of the reaction mixture dropped and then rose without external heating, due to an exothermic reaction taking place. It rose over a period of 30 minutes to 30° C. and was held there for 1 hour by external heat application. After that one hour at 30° C., the pH was 11.7. This was adjusted with 0.4 ml. of 2-molar phosphoric acid to a pH of 7.7.

For Stage II, the temperature of the reaction mixture was raised to 70° C. for 4 hours and 25 minutes. Then it was spread uniformly on a tray for Stage III treatment at 110° C. for 12 hours.

Analysis of this example showed the product to have a cold-water-insolubility of 80%, a hot water-(phosphate-buffer)-insolubility of 32% and an Availability Index of 60.

Example V

Into a reaction vessel were charged 304.25 grams of urea pellets and 122.40 grams of paraformaldehyde (97.8 powder), giving a mol ratio of 1.25 to 1.0. Water, 100 grams, and 1-N potassium hydroxide, 15 ml. were added with moderate agitation. The reaction mixture was heated to 33° C. for 1 hour and 50 minutes, after which time the pH of 11.8 was adjusted to pH 7.8 with 2 ml. of 2-molar phosphoric acid. The temperature of the reaction mixture was raised to 70° C. and held there for 5 hours and 35 minutes, whereupon the mixture was spread uniformly on a tray and dried at 110° C. for 10 hours. The resultant dry product was 65.7% insoluble in cold water with a 35.6% hot-water-(phosphate-buffer)-insolubility, giving an Availability Index of 45.8. This example indicates that the lengthy Stage III heating, even at a mol ratio of 1.25 produces a product approaching the upper practicable limit, since the Availability Index is lower than would usually be desired. A substantial amount of the material tends to become unavailable because of being to slowly biologically degradable. Also, the amount of cold-water-soluble nitrogen is too high for safe heavy application of the fertilizer.

Example VI

A reaction charge was made up by combining, with mild agitation, 60.9 grams of urea pellets, 36.8 grams of paraformaldehyde (97.8% powder), 20 grams of water and 3 ml. of 1-N potassium hydroxide. The mol ratio is 0.83 to 1. The temperature of the mixture dropped to 7° C. and of its own accord rose to 25° C. The temperature was held at 25 to 29° C. for one hour, after which the pH was adjusted from 10.2 to 7.5 with 2-N sulfuric acid. The temperature of the reaction mixture was then raised to 75° C. and held there for four hours, after which it was dried at 110° C. for 3 hours and 30 minutes. Analysis of the product showed a cold-water-insoluble fraction of 74.3%, a hot-water-(phosphate-buffer -insoluble fraction of 17.8% and an Availability Index of 76. This example indicates that the Stage III heating is too short even with the mol ratio of 0.83, and the product approaches the lowest practicable limit, having too low a cold-water-insoluble fraction. The material tends to be too readily biodegradable to be considered within the category of slow-nitrogen-release fertilizers and therefore outside the scope of this invention.

I claim:

1. A method for making a fertilizer-type urea formaldehyde product having more than 65% cold-water-insoluble nitrogen and having an Availability Index higher than 45, comprising the steps of:

(I) reacting at 25° to 45° C. for 1 to 4 hours an alkaline aqueous mixture at pH 10 to 12, at the reaction temperature, of urea and an aldehyde chosen from the group consisting of formaldehyde and paraformaldehyde, in a urea-to-formaldehyde mol ratio of about 1.25 to about 0.83;

(II) adjusting the pH to between 7 and 8 at said reaction temperature and then heating to between 60° and 80° C. for from 4 to 25 hours, and (III) heating at 100° to 110° C. for from 1 to 10 hours.

2. The method of claim 1 wherein said aldehyde is paraformaldehyde and water is present in the amount of 15% to 40% by weight of the urea plus the aldehyde.

3. The method of claim 1 wherein step I is carried out at 39° to 41° C.

4. The method of claim 1 wherein step II is carried out at 65° to 75° C. for 5 to 7 hours.

5. The method of claim 1 wherein the pH in step II is about 7.4.

6. The method of claim 1 wherein the time in step III is 1 to 4 hours.

7. The method of claim 1 wherein the alkalinity of the mixture in step I is obtained by adding potassium hydroxide to the aqueous mixture of urea and aldehyde.

8. The method of claim 1 wherein the adjustment of pH in step II is obtained by adding phosphoric acid to the reaction product of step I.

9. The method of claim 1 wherein the step II product is stored for several days before carrying out step III.

References Cited
UNITED STATES PATENTS

| | | | |
|---|---|---|---|
| 3,231,363 | 1/1966 | Renner | 71—28 X |
| 3,198,761 | 8/1965 | O'Donnell | 71—28 X |
| 3,677,736 | 7/1972 | Formaini | 71—28 |
| 3,649,598 | 3/1972 | Mamioka et al. | 71—28 |
| 3,462,256 | 8/1969 | Justrel et al. | 71—28 |

SAMIH N. ZAHARNA, Primary Examiner

R. BARNES, Assistant Examiner

U.S. Cl. X.R.

260—29.4, 69